United States Patent [19]

Schonfeld

[11] Patent Number: 4,891,981
[45] Date of Patent: Jan. 9, 1990

[54] METHOD FOR DETERMINING THE POSITION AND MAGNITUDE OF UNBALANCE CORRECTION

[75] Inventor: Harald Schonfeld, Darmstadt, Fed. Rep. of Germany

[73] Assignee: Carl Schenck AG, Fed. Rep. of Germany

[21] Appl. No.: 191,562

[22] Filed: May 9, 1988

[30] Foreign Application Priority Data

May 9, 1987 [DE] Fed. Rep. of Germany ....... 3715499

[51] Int. Cl.$^4$ ......................... G01M 1/16; G01M 1/22
[52] U.S. Cl. ........................................ 73/460; 73/461; 73/462
[58] Field of Search ................. 73/459, 460, 461, 462, 73/468, 469, 470; 364/508, 571.02

[56] References Cited

U.S. PATENT DOCUMENTS

| | | |
|---|---|---|
| 3,478,603 | 11/1969 | Bonessa . |
| 4,068,532 | 1/1978 | Green et al. ............................ 73/462 |
| 4,109,312 | 8/1978 | Beutel ..................... 73/462 |
| 4,193,304 | 3/1980 | Hofmann ............................. 73/462 |
| 4,300,197 | 11/1981 | Schonfeld ............................ 73/461 |
| 4,759,217 | 7/1988 | Brihier .................... 73/462 |

FOREIGN PATENT DOCUMENTS

| | | |
|---|---|---|
| 3046368 | 8/1981 | Fed. Rep. of Germany . |
| 2405764 | 5/1982 | Fed. Rep. of Germany . |
| 2737524 | 1/1983 | Fed. Rep. of Germany . |
| 2823219 | 5/1986 | Fed. Rep. of Germany . |
| 3629059 | 3/1987 | Fed. Rep. of Germany . |
| 3617625 | 10/1987 | Fed. Rep. of Germany . |
| 0142436 | 6/1986 | Japan ..................................... 73/460 |

Primary Examiner—Michael J. Tokar
Assistant Examiner—Robert P. Bell
Attorney, Agent, or Firm—Connolly and Hutz

[57] ABSTRACT

The position and magnitude of an unbalance correction in specified correction planes is determined for the purpose of reducing a determined unbalance in a body. Such correction planes may comprise the inner and outer surfaces of a wheel. Incremental correction is provided with respect to magnitude and continuous correction is provided with respect to the position in order to achieve minimalization of the residual static unbalance with only one correction weight per correction plane. The existing unbalance in the correction planes according to magnitude and position is determined, and the influence of various corrections upon the static and the dynamic residual unbalance that can be accomplished with one correction weight per correction plane are also determined. Corrections are provided in the correction planes for balancing that produce the minimally possible static residual unbalance and which fall within predetermined limits in each correction plane.

4 Claims, 6 Drawing Sheets

Correction Planes
5-Unbalance Measuring Unit
1-Balancing Machine

METHOD FOR DETERMINING THE POSITION AND MAGNITUDE OF UNBALANCE CORRECTION

BACKGROUND OF THE INVENTION

The present invention addresses a method for the determination of the position and magnitude of an unbalance correction in specified correction planes for the purpose of reducing a determined unbalance in a body wherein the correction is provided in increments with respect to magnitude and a continuous correction is provided with respect to position.

Such methods cause the reduction of a determined unbalance by carrying out incremental corrections with respect to magnitude and continuous corrections with respect to position as for instance in the case of balancing motor car wheels with pneumatic tires thereon by means of attaching incremental lead weights at certain angular positions. The correction planes comprise the inner and outer surfaces of the wheel.

In the method known from U.S. Pat. No. 3,478,603, the unbalance of a motor vehicle wheel with a pneumatic tire thereon is determined by means of a balancing machine upon which the wheel is horizontally mounted. Any static unbalance results in an inclination of the plane of the wheel with respect to the horizontal. By means of an indicating instrument the lightest or least heaviest spot on the wheel is determined. For unbalance correction, several incrementally stepped weight sets with four correction weights each of uniform mass, are available. The four correction weights of a given weight set are arranged in pairs upon the rim flanges and are movable in such a manner that there is an angle of 120° between them and also an angle of 60° with respect to the lightest point. By means of symmetric shifting of the pairs of weights, the wheel becomes balanced. In some cases the weight pairs of another weight set must be employed. Following this, one of the correction weights of each pair is fastened to the rim flange, while the second correction weight of each pair is fastened to the opposite rim flange. This method for static balancing of a vehicle wheel is involved and very time-consuming and requires a great number of correction weights. The in-pair relationship of the weights also requires a special design.

SUMMARY OF THE INVENTION

The present invention primarily concerns a method for determining the position and the magnitude of a correction for the purpose of reducing unbalance wherein it is possible to achieve minimal static residual unbalance with only one correction weight per correction plane.

According to the invention, this objective is accomplished by determining the magnitude and position of unbalance in the correction planes, and defining the influence of various corrections per correction plane upon the static and dynamic residual unbalance. In each case only one correction weight per correction plane is provided, and whereby those corrections in the correction planes are provided for balancing, which produce minimal static residual unbalance and which fall within predetermined limits in each correction plane. In a wheel the correction planes comprise the inner and outer surfaces of the wheel.

With this invention one achieves with the simplest possible means, namely through provision of one correction balancing weight in each of the two correlation planes, a substantial reduction of the static residual unbalance of a body. Balance by means of incremental balancing weights is assured. Of the possible corrections by means of incremental correction weights, the one correction is determined that will produce the minimally possible static residual unbalance and for which, based on residual unbalances per correction plane, the remaining dynamic residual unbalance is negligibly small. Hence, an upper limit for the dynamic residual unbalance and therefore an upper limit for the residual unbalance per correction plane may be prescribed. It should be noted, that—taking into consideration the ISO 1925 definition—dynamic unbalance as used herein means couple unbalance as defined in ISO 1925.

With the present invention, the incremental balancing error which is always present when balancing with incremental connection weights, is transferred into the dynamic realm, which proves advantageous for disc-like bodies especially vehicle wheels, with respect to vibration-free running. With the method of the present invention, corrections are determined that completely eliminate static unbalance in the majority of cases if one overlooks unbalances based on accidental errors, e.g. incorrect mass of the correction weights or incorrect mounting procedures during the attachment of the correction weights.

A simplification of the method results when the various corrections are determined through finding the two weight increments in each correction plane which are closest to the determined unbalance.

Also expedient is a procedure whereby combinations of two correction weight increments per correction plane are formed and the resultant of which corresponds to the resulting unbalance. The difference of each combination toward the unbalance in one of the two correction planes is determined.

One combination is determined that shows the smallest difference, and in cases where the difference is not larger than the permissible residual unbalance per correction plane, this combination is selected as correction in the one correction plane. The correction selected for the other correction plane is obtained form the correction in the first correction plane and the resulting unbalance. In cases where the difference is larger than the permissible residual unbalance per correction plane, corrections are determined, the resultant of which deviates from the resultant unbalance and out of these determined corrections, the one correction is provided which has the smallest deviation from the resulting unbalance.

In the great majority of cases the difference in the correction of unbalance is not larger than the predetermined permissible residual unbalance per correction plane which depends on the tolerable dynamic unbalance. Therefore, with a few quick steps, the correction for complete elimination of static unbalance is determined. For the few remaining cases which concern especially bodies with unbalances that lie at an angle of 0° and 180° to each other, the determination of the correction to achieve minimal static residual unbalance is ascertained with a few additional procedural steps.

It has proven advantages if, for the purpose of determining the correction, those corrections are utilized which deviate from the determined unbalance by an amount equivalent to the permissible residual unbalance. Alternatively, if corrections are utilized the direction of which corresponds to the direction of the resulting unbalance or are opposite to it, and the sums of which deviate from the resulting unbalance but do not exceed a predetermined unbalance per correction plane. It is expedient for the purpose of determining the correction, to utilize those corrections that have either in the direction of the resulting unbalance or opposite to it, the smallest difference with respect to the unbalance to be determined in the respective correction plane.

BRIEF DESCRIPTION OF THE DRAWING

Novel features and advantages of the present invention in addition to those noted above will become apparent to those of ordinary skill in the art from a reading of the following detailed description in conjunction with the accompanying drawing wherein similar reference characters refer to similar parts and in which.

DETAILED DESCRIPTION OF THE INVENTION

Figure 1:
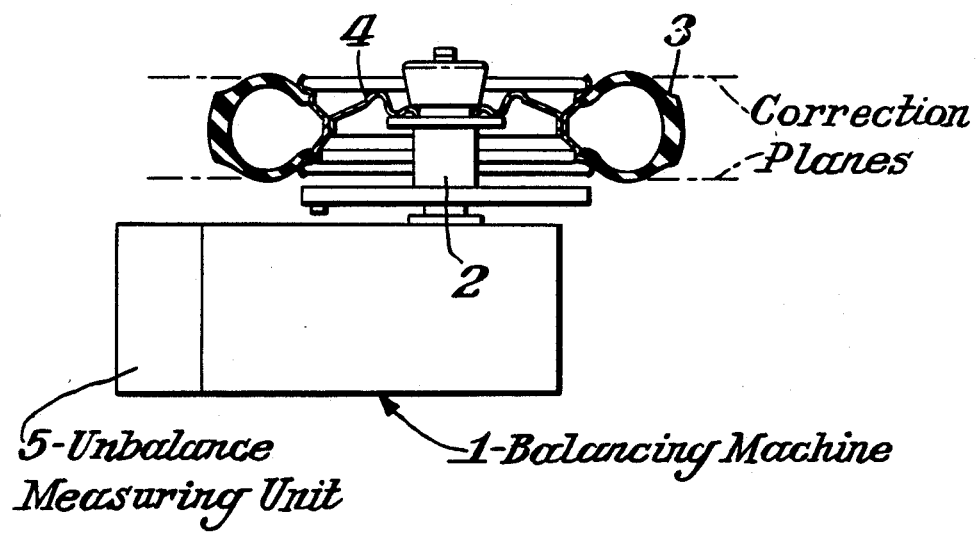
FIG. 1 is a side elevational view of a balancing machine with a pneumatic wheel (shown in section) mounted on the machine, and illustrating the two correction planes of the wheel.

Referring in more particularity to the drawing, FIG. 1 shows a balancing machine 1 having a balancing spindle 2 upon which a disc-like body is arranged such as a vehicle wheel 4 with a pneumatic tire 3 mounted thereof. By means of vibration transducers (not shown), the vibrations which result from an unbalance of the vehicle wheel 4 are sensed and delivered to an unbalance measuring unit 5 together with the reference impulses which occur once per revolution of the rotating vehicle wheel. In order to reduce the unbalance, specified correction weights, determined by balancing measuring unit 5, are attached in both correction planes of the wheel. The correction planes are indicated as dashdot lines in FIG. 1.

Figure 2:
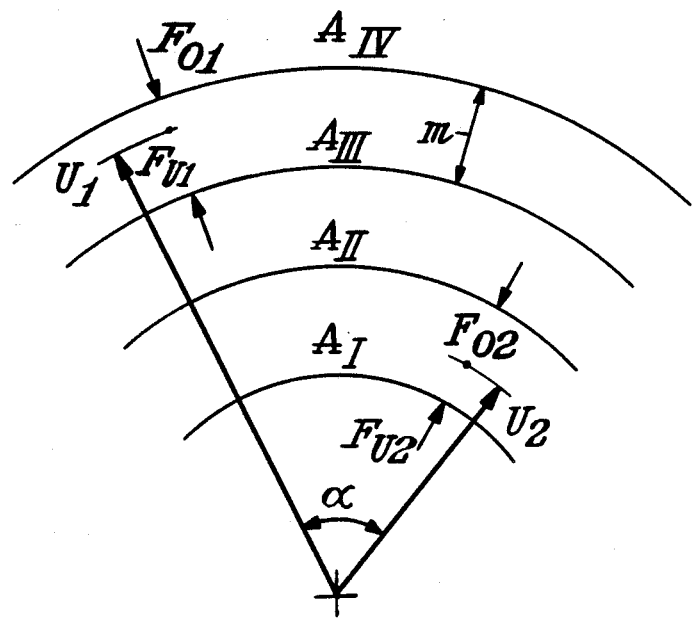
FIG. 2 is a schematic diagram showing the determination of unbalances in the respective correction planes including the increments of the correction weights.

In FIG. 2 the unbalances are shown and designated $U_1$ and $U_2$, respectively, and these fully compensate the unbalances measured by means of the balancing measuring unit 5 in both correction planes of the vehicle wheel.

$U_1$ refers to the first correction plane and $U_2$ refers to the second correction plane. The two unbalance vectors $U_1$ and $U_2$ are offset from each other by the angle $\alpha$. The correction weights provided for the correction of the unbalance of the wheel are incrementally stepped with respect to their weights. The weight steps of the correction weights with the increment "m" are indicated in FIG. 2 as circles and are designated as $A_I$, $A_{II}$, $A_{III}$, and $A_{IV}$.

Figure 3:
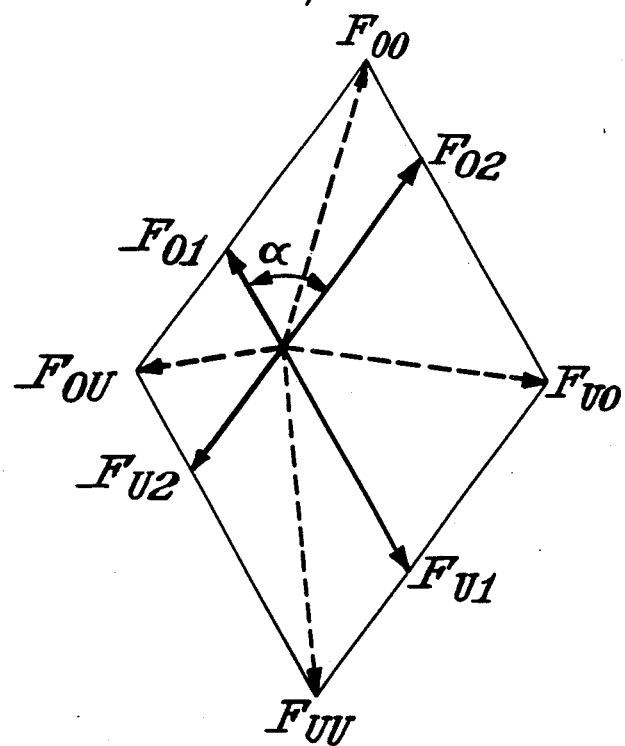
FIG. 3 is vector diagram of possible static residual unbalances which result from the increments of correction weights.

For example, if a correction weight is selected that comes closest to the measured unbalance in both correction planes independent of each other, then, as can also be seen from FIG. 3, a residual unbalance remains after the correction procedure. For instance, the correction may be carried out with a correction weight $A_1$ of the weight-step $A_{IV}$ for the first plane and with a correction weight $A_2$ of the weight-step $A_I$ for the second plane. As a result, a static residual unbalance $F_{ou}$ is produced which stems from the step error $F_{o1} = A_{IV} - U_1$ and from the step error $F_{u2} = U_2 - A_I$. In FIG. 3 these values are emphasized by heavy lines. Since for each unbalance $U_1$, $U_2$, either one of two correction weights can normally be used which differ by the increment "m", based on the incremental size of the correction weights, a total of four possible vectorial residual unbalances $F_{ou}$, $F_{oo}$, $F_{uo}$, $F_{uu}$ results (Index o stands for over, Index u stands for under).

According to the invention, it is provided that the static residual unbalance, for instance the residual unbalance $F_{ou}$, will be eliminated or adjusted so that it lies within permissible limits by offsetting the correction weights $A_1$ and $A_2$, respectively, with respect to the position measured with the unbalance measuring unit, by an angle $\gamma_1$ and $\gamma_2$, respectively. This detail is possible and is principally shown in FIG. 4 where the procedure is demonstrated in the form of an example. Through offsetting of the angle for the correction weight $A_1$ by the angle $\gamma_1$ in the first correction plane away from the direction represented by the vector $F_{o1}$, that is the direction corresponding to the direction of $U_1$, an unbalance $W_1$ in the transverse direction is created. Also, through offsetting of the angle of the correction weight $A_2$ by the angle $\gamma_2$ in the second correction plane, an unbalance $W_2$ is created. The offsets of the angles $\gamma_1$ and $\gamma_2$ are chosen so that the unbalances $W_1$ and $W_2$, the directions of which are essentially perpendicular to the direction of the corresponding unbalance vectors $U_1$ and $U_2$, will completely compensate $F_{ou}$ if vectorially added. The vector sum of $W_1$ and $W_2$ is represented by the dash-dot vector which is equal in size to $F_{ou}$ but runs in the opposite direction.

Figure 4:
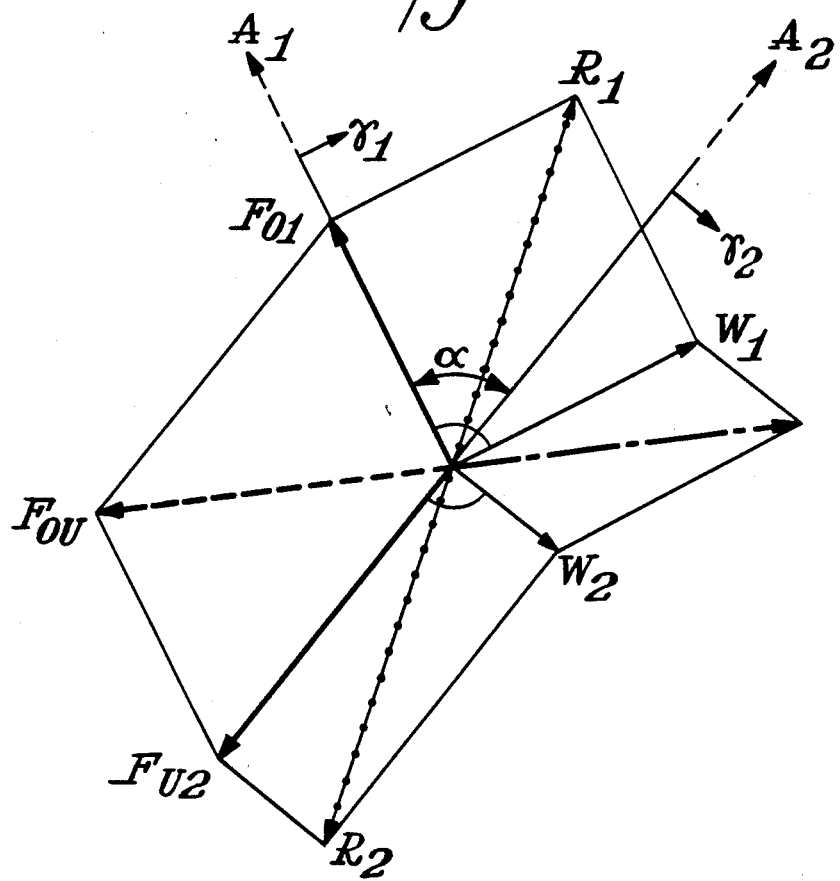
FIG. 4 is a vector diagram illustrating the influence of an angular offset of the correction weights.

For each correction plane, the residual unbalance is increased to $R_1$ and $R_2$, respectively, whereby $R_1$, $R_2$ in the example of FIG. 4 is, in each case, the vector sum out of $F_{o1}$ and $W_1$ and $F_{u2}$ and $W_2$, respectively. The contributions of $R_1$ and $R_2$ are of equal size but the directions are opposite. As a result of the offset in angle of the incremental correction weights, the static residual unbalance of the vehicle wheel is fully eliminated after the balancing procedure. The residual unbalances $R_1$ and $R_2$ that are of equal magnitude but run in opposite directions in both correction planes result in a negligible dynamic residual unbalance of the vehicle wheel, which may be assured by observing that the amounts of the residual unbalances fall within the limiting values $R_{max}$ in each plane.

Figure 5:
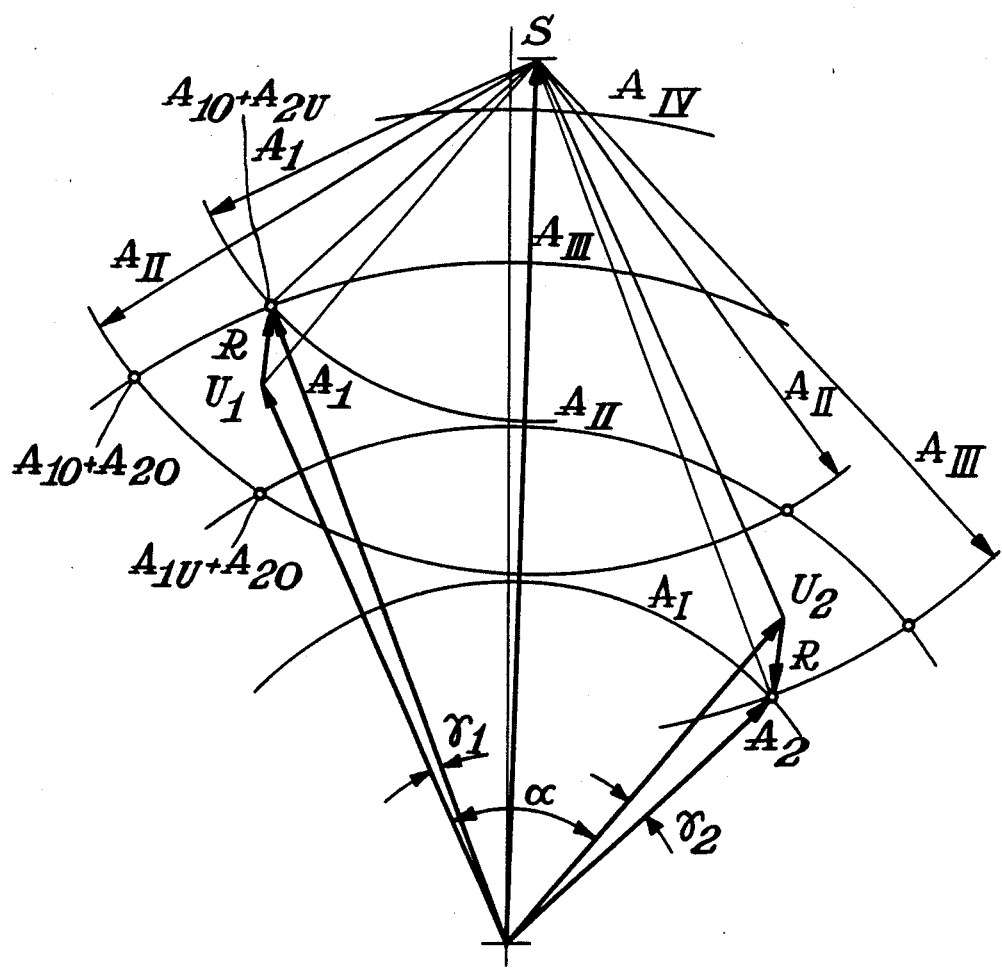
FIG. 5 is a combined vector and schematic diagram illustrating the procedural steps of the present invention.

The method according to the invention is further illustrated in FIGS. 5 through 9 as following. FIG. 5 schematically shows the unbalances $U_1$ and $U_2$ which completely compensate the measured unbalances for both correction planes together with the weight increments $A_I$ and $A_{IV}$ of the incremental correction weights. The same is shown in FIG. 2. In accordance with the invention, the two correction weights nearest in weight are determined for each correction plane. For the first plane they are in the example according to FIG. 5 the correction weight increments $A_{II}$ and $A_{III}$ whereby the amount of unbalance $U_1$ lies between the correction weight steps $A_{II}$ and $A_{III}$. The correction weight increments are indicated through concentric circular lines around the point of intersection of $U_1$ and $U_2$. For the second plane these are the correction weight increments $A_I$ and $A_{II}$ with reference to the unbalance $U_2$. The resulting vector of unbalance consists of the unbalance vectors $U_1$ and $U_2$ and is designated by S.

At this stage, the maximum four possible vector combinations are determined that form as resultants the resulting unbalance vector S from two of these four correction weight increments near the unbalance $U_1$ or $U_2$. In the presentation according to FIG. 5 these are the three combinations near the unbalance $U_1$. They are designated as $A_{1o}+A_{2u}$, $A_{1o}+A_{2o}$, $A_{1u}+A_{2o}$. The fourth possible combination $A_{1u}+A_{2u}$ does not appear in the example of FIG. 5 because of the chosen increments.

Thereafter, the vectorial differences R of these combination to the unbalance $U_1$ and $U_2$ respectively are determined and the amount of the smallest difference is compared with $R_{max}$ which is determined by the permissible dynamic residual unbalance.

In the example of FIG. 5, the smallest differential value R is not larger than $R_{max}$ and results from the combination $A_{1o}+A_{2u}$. $A_{1o}+A_{2u}$ represents the determined correction $A_1$ for the first correction plane. Since the vector sum $A_1$ and $A_2$ should produce the resultant unbalance vector S, $A_2$ is herewith determined. After the balancing procedure, the static unbalance of the vehicle wheel is eliminated and the dynamic unbalance lies within the permissible limits.

Figure 6:
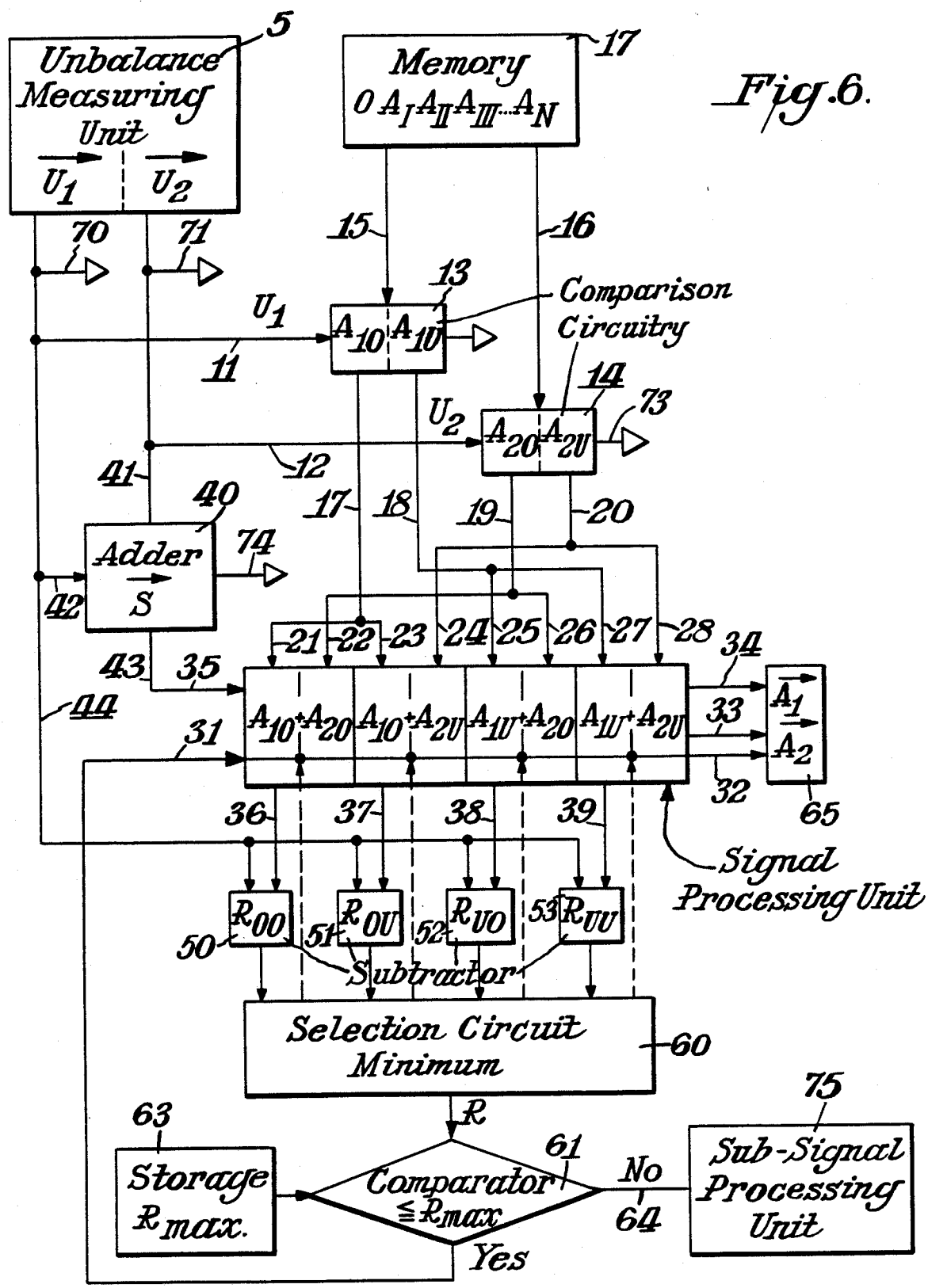
FIG. 6 is a flow diagram illustrating the method of the present invention.

FIG. 6 shows the signal processing for the method according to the invention. The unbalance values $U_1$ and $U_2$ (vectorial unbalance values) which completely compensate the unbalance values measured by the unbalance measuring unit 5 for each correction plane, are transmitted via signal lines 11 and 12, respectively, to comparison circuitry 13 and 14, respectively. The comparison circuits 13 and 14 also have another input from a non-volatile memory 17 via signal lines 15 and 16 which transmit information from the memory 17. In memory 17 are stored N +1 weight increments of the correction weights O, $A_1$, $A_{II}$, $A_N$ according to magnitude. In the comparison circuitry 13, 14, a comparison is made between the magnitude of the unbalance, $U_1$, $U_2$ with the correction weight values $C, A_I ..., A_N$ and the closest correction weight increments, $A_{1o}$ and $A_{1u}$ for the first correction plane and $A_{2o}$ and $A_{2u}$ for the second correction plane, on either side of the unbalance magnitude, are being determined and are kept ready for further data processing.

The adder 40 receives, via signal line 41 and 42, the unbalance vectors $U_1$ and $U_2$ and through vector addition a resulting unbalance vector S is obtained which is then available at output 43. The selectively chosen correction weight increments $A_{1o}$, $A_{1u}$, and $A_{2o}$, $A_{2u}$ are transmitted via coordinated signal lines 17, 18 and 19, 20 to the inputs 21 through 28 of a signal processing unit 30. Specifically the correction weight step $A_{1o}$ is directed to the input terminals 21 and 23; $A_{2o}$ to the input terminals 22 and 26; $A_{2u}$ to the input terminals 24 and 28; and $A_{1u}$ to the input terminals 25 and 27. Also, a control input 31 and a control output 32 are provided as well as signal outputs 33, 34. A further input 35 receives the vector signal S obtained from the output 43 of the adder 40. The control input 31 controls the signal outputs 33 and 34, as explained more fully below.

The signal processing unit forms out of the available input values $A_{1o}$, $A_{1u}$, $A_{2o}$ and $A_{2u}$ and the vector signal S four vectorial combinations, namely $A_{1o}+A_{2o}$, $A_{1o}+A_{2u}$, $A_{1u}+A_{2o}$ as well as $A_{1u}+A_{2u}$, and each of these has as a resultant the vector S.

The signals that represent these combinations are fed via leads 36, 37, 38 and 39 to subtractors 50, 51, 52 and 53, which also receive the existing unbalance signal that is available on signal leads 42 and 44, respectively, that represents the unbalance vector $U_1$. The subtractors form the vectorial differences R of the combinations $A_{1o}+A_{2o}$, $A_{1o}+A_{2u}$, $A_{1u}+A_{2o}$, $A_{1u}+A_{2u}$ with the unbalance vector $U_1$.

The values of the difference vectors R are available at the outputs of the subtractors 50 through 53. These values are led to a selection circuit 60 that separates out the smallest difference. This smallest difference value is lead to a comparator 61 with an extra input to which the value of the maximal permissible residual unbalance $R_{max}$ is transferred from storage 63.

If R is not larger than $R_{max}$, the control input 31 of the signal processing unit 30 receives a control signal via the control line 62. As a result thereof, the signal which is coordinated to the difference value of this combination becomes available at the outputs 33, 34. From control output 32 in the unit 65, the difference value is indicated as a vectorial correction $A_1$, $A_2$ or is kept ready for further processing. As explained above, and as demonstrated in FIG. 5, the static unbalance of the vehicle wheel is completely eliminated and the dynamic unbalance lies within permissible limits.

If R is larger than $R_{max}$, then, with respect to the dynamic unbalance, the static unbalance cannot be fully eliminated. The static residual unbalance is however, being reduced to a minimal value by means of the two following segments of the method. A suitable signal is obtained through signal lead 64 which initiates the parallel processing of both of these segments of the method and causes the transfer of signals available in those places marked by arrows 70 through 75 to sub-signal processing units. Of the two correction values delivered by the two segments of the method, one correction $A_1$, $A_2$, is selected for correction, the resultant of which shows the smaller difference to the resultant unbalance vector S.

Figure 7:
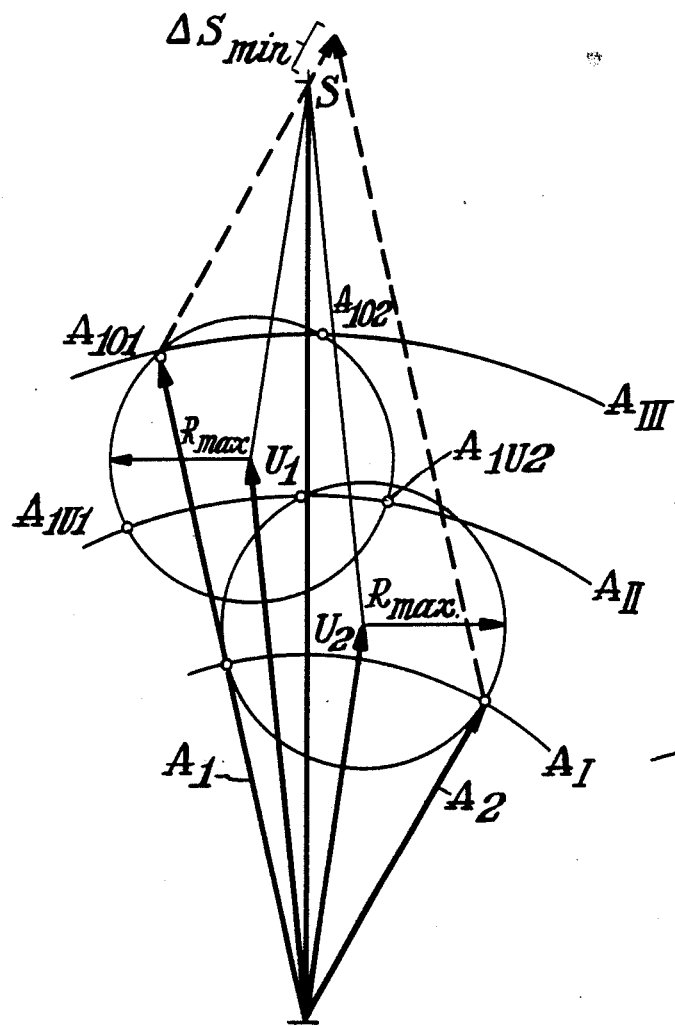
FIGS. 7 through 9 are combined vector and schematic diagrams illustrating specific procedural steps of the present invention.

The two segments being carried out in parallel are explained below with the aid of FIGS. 7 through 9. FIG. 7 plots one of the two segments of the method, similar to FIG. 2. Given are the compensational unbalance $U_1$ in the first correction plane and the compensational unbalance $U_2$ in the second correction plane, the resultant unbalance vector S as well as the correction weight increments $A_I$ through $A_{III}$. In this example, the unbalances lie in much closer angular proximity to each other than shown in FIG. 5. The two corrections $A_1$ and $A_2$ are being determined, each of which is distanced by the amount of $R_{max}$ from the unbalances $U_1$ and $U_2$ in their respective planes and the resultant of which, differs as little as possible from the unbalance vector S. The corrections $A_1$ and $A_2$ which differ by the amount $R_{max}$ from the unbalances $U_1$ and $U_2$, respectively, are positioned on a circle with the radius $R_{max}$ around the points of the unbalance vectors $U_1$ and $U_2$, respectively. Since the correction is to be done in increments, the corrections $A_1$ and $A_2$ are also positioned on circles formed by the respective next following weight increment as radius around the beginning of vector $U_1$. In the example of FIG. 7, the corrections $A_{1o1}$, $A_{1o2}$, $A_{1u1}$ and $A_{1u2}$ result from the corresponding intersections for the first correction plane as shown in FIG. 7.

A signal processing unit (not shown) serves the purpose of determining the possible corrections $A_1$ and $A_2$ with the help of the values for the unbalance vectors $U_1$ and $U_2$, respectively. This is accomplished with the help of the two next following correction weight increments as well as the amount $R_{max}$. All of the determined corrections $A_1$ and $A_2$ are then vectorially combined and those combinations of the two corrections $A_1$ and $A_2$, the resultant of which deviates the least from the resultant of the unbalances $U_1$ and $U_2$, are determined. For this purpose a difference is formed between the resultant of the corrections $A_1$ and $A_2$ and the resultant $S$ of the unbalance vectors $U_1$ and $U_2$, and the one combination of $A_1$ and $A_2$ which shows the least difference $\Delta S_{min}$ is selected and kept available for further processing.

Figure 8:
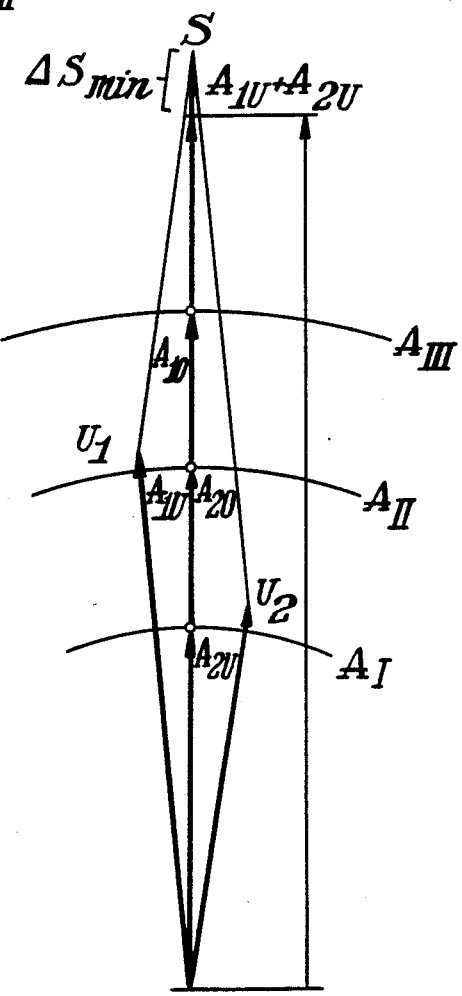

FIG. 8 shows the other segment of the method which is simultaneously carried out. Similar to FIG. 2, the compensational unbalances $U_1$, $U_2$ and the resulting unbalance vector $S$ as well as the correction weight increments $A_I$ through $A_{III}$ are plotted. Two specific corrections $A_1$ and $A_2$ are being determined which may either be oriented in the direction of the resultant unbalance vector $S$ or may be turned 180° to the direction of the resultant $S$. The sum deviates as little as possible from the resultant unbalance vector $S$ and the error determined through the difference between the respective correction and the respective unbalance per correction plane, is as small as possible. Because the directions of the vector $S$ and $A$ are either the same or opposite, scalar designations which are defined by the magnitude of $A_1$, $A_2$, and $S$ are preferably used for the determination of the corrections $A_1$ and $A_2$.

In a signal processing unit (not shown) the deviations of the possible correction amounts $A_{1o}$, $A_{1u}$ and $A_{2o}$, $A_{1u}$ from their associated unbalances $U_1$ and $U_2$, respectively, are determined. The amounts of correction with the smallest deviation per plane are used for the purpose of building appropriate combinations $A_{1o}+A_{2o}$, $A_{1o}+A_{2u}$, $A_{1u}+A_{2o}$ as well as $A_{1u}+A_{2u}$. Of the combinations which are considered, the one combination if separated out which has the smallest deviation from $S$ and is made available for further processing as correction $A_1$, $A_2$. In the example of FIG. 8, the corrections $A_{1u}$ and $A_{2u}$ have the smallest error per correction plane and deviate in their sum by the amount of $\Delta S_{min}$ from $S$. As a possible correction $A_1$, this method therefore delivers $A_{1u}$ and the weight increment $A_{II}$, respectively, while as correction $A_2$ results $A_{2u}$ and the weight increment $A_I$ respectively. The corrections $A_1$, $A_2$ are oriented in the same direction which is determined by the resultant unbalance vector $S$.

The correction values $A_1$, $A_2$ determined in the process section according to FIG. 7 and in the process section according to FIG. 8 are compared. The correction value $A_1$, $A_2$ of which the resultant has the smaller difference $\Delta S_{min}$ from the resulting unbalance vector is ultimately indicated and kept available for further processing.

Figure 9:
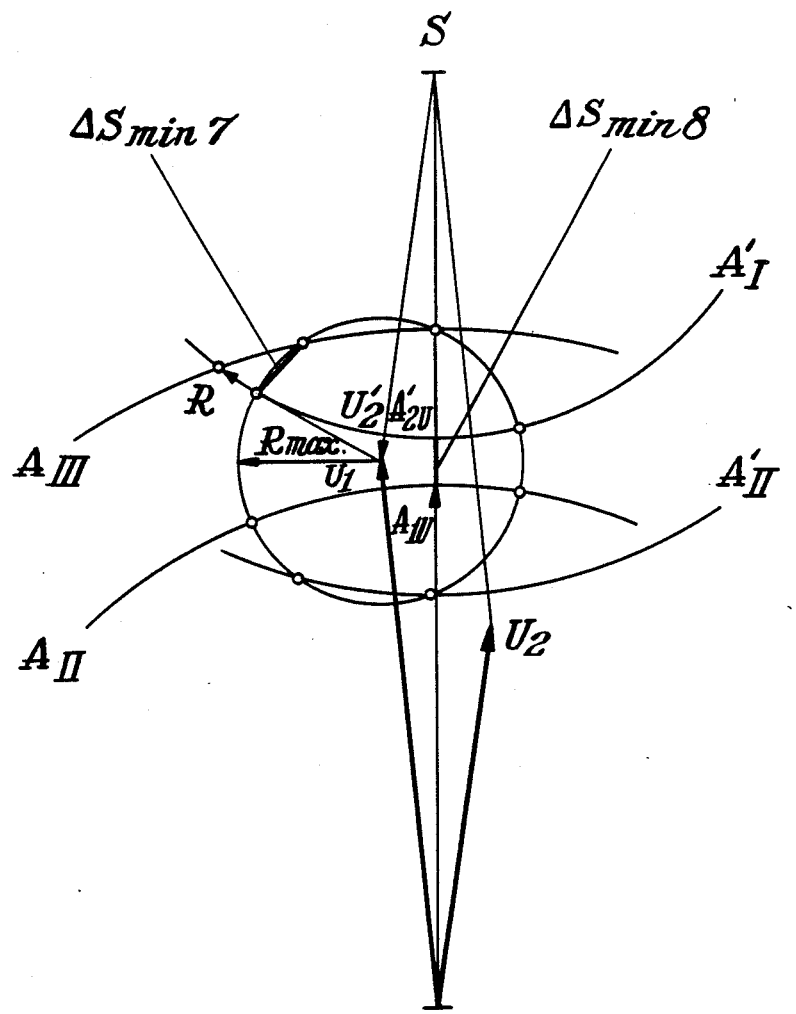

FIG. 9 summarily shows the conditions that result from the two method segments according to FIGS. 7 and 8.

As can be seen from this presentation, $R$ is larger than $R_{max}$; considering the permissible dynamic unbalance, the static unbalance of the vehicle wheel cannot be completely eliminated. In this example, one obtains the preferable correction for the purpose of the reduction of unbalance, out of corrections $A_1$, $A_2$ which were determined in the method segment according to FIG. 8, since the difference $\Delta S_{min\ 8}$ between the resultant of the corrections $A_1$, $A_2$ and the unbalance resultant $S$ is smaller than the difference $\Delta S_{min\ 7}$ which results from method-segment according to FIG. 7.

As optimal values for the reduction of the wheel unbalance in both correction planes, the following corrections are indicated and/or made available for further processing according to FIG. 9.

$A_1$ = correction weight increment $A_{II}$ in the direction of the unbalance resultant, and $A_2$ = correction weight increment $A_I$ in the direction of the unbalance resultant.

The method explained above is especially advantageously executed by means of an electronic computation device which is part of an unbalance measuring unit.

What is claimed is:

1. In a method for determining the position and magnitude of a correction in correction planes for the purpose or reducing a determined unbalance in a body whereby incremental correction is provided with respect to magnitude and continuous correction is provided with respect to position, the improvement comprising the steps of defining unbalance of a body in correction planes according to magnitude and position, determining the influence of several corrections for each correction plane upon static and dynamic residual unbalance through two correction weight increments which are closest to the defined unbalances per correction plane, forming combinations of the two correction weight increments per correction plane, the resultant of which corresponds to the resulting unbalance, defining a difference between each combination and the unbalance in one of the two correction planes, determining the one combination that shows the smallest difference, and when the difference is not larger than the residual unbalance permissible for each correction plane, utilizing the one combination as correction in the one correction plane, and selecting those corrections in each correction plane which represent the minimal possible static residual unbalance and the residual unbalance of which, per correction plane, lies within predetermined limits.

2. The method of claim 1 including the step of determining the correction to be provided in the second correction plane by means of the correction in the first correction plane and the resultant unbalance, and, when the difference is larger than the permissible residual unbalance per correction plane, corrections are defined, the resultants of which differ from the resultant unbalance, and selecting out of these determined corrections the one correction with the smallest difference from the resulting unbalance.

3. The method of claim 2 characterized in that in the determination of the corrections those corrections are utilized that differ from the determined unbalance in each correction plane by the permissible residual unbalance, and alternately those corrections the directions of which coincide with or are opposite to the resultant unbalance, the sums of which differ from the resultant unbalance, and which do not exceed a predetermined difference toward the unbalance in each correction plane.

4. The method of claim 3 characterized in that corrections are utilized for the determination of corrections that are in the direction of or opposite to the resultant unbalance and have the smallest difference to the determined unbalance in their respective correction planes.

* * * * *